Aug. 13, 1957  L. E. NORTON  2,802,944
OSCILLATORS EMPLOYING MICROWAVE RESONANT SUBSTANCE
Filed Dec. 30, 1953.  3 Sheets-Sheet 1
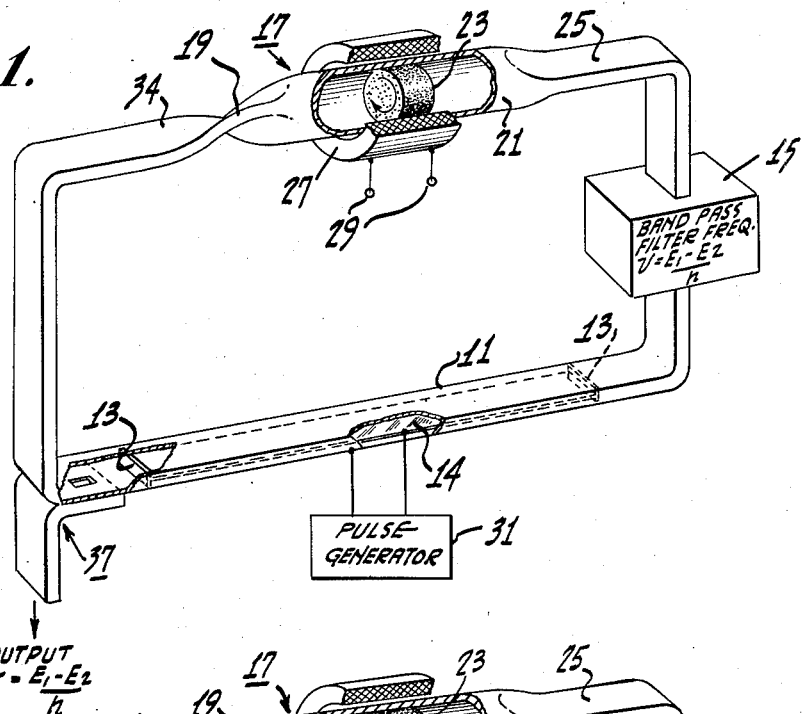
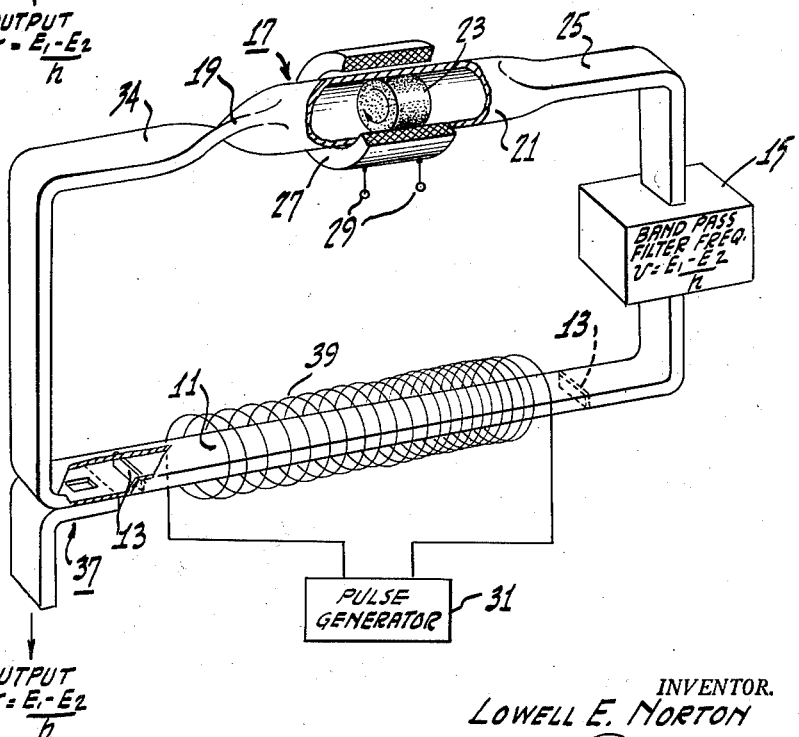
INVENTOR.
LOWELL E. NORTON
BY

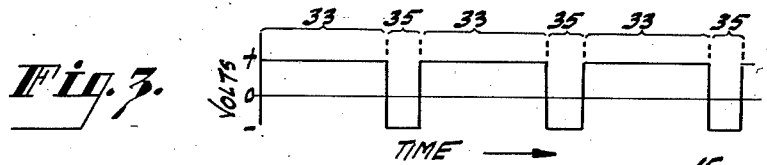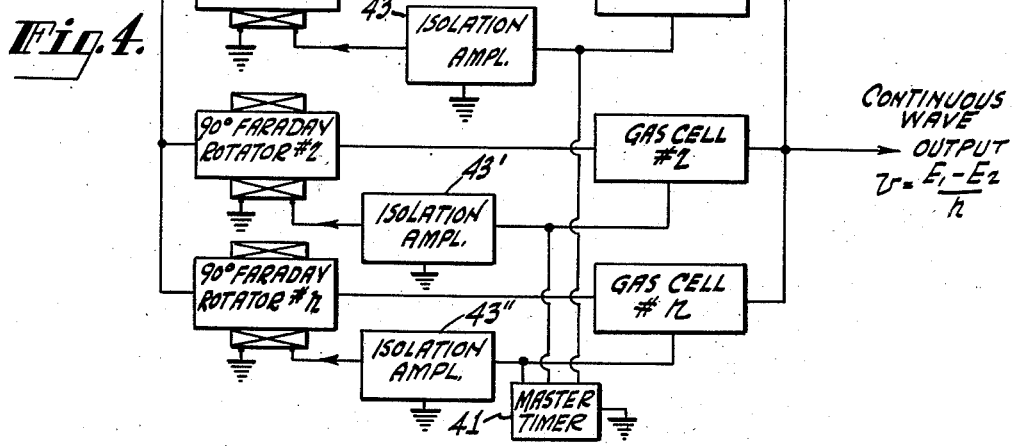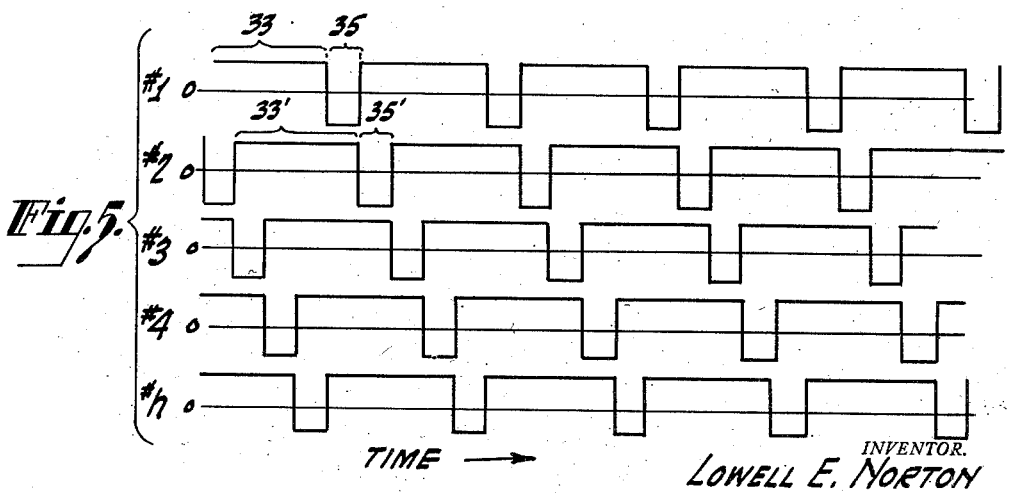

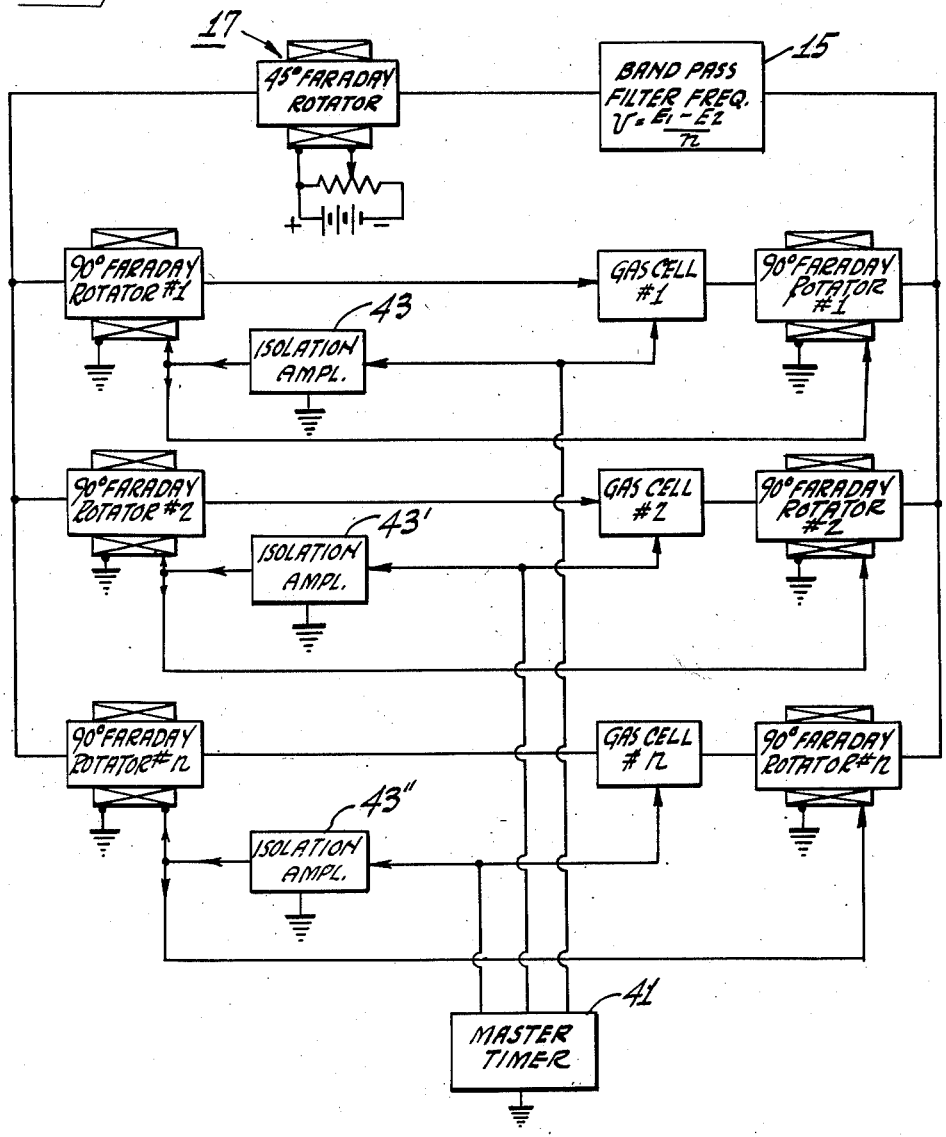

United States Patent Office 2,802,944
Patented Aug. 13, 1957

2,802,944

OSCILLATORS EMPLOYING MICROWAVE RESONANT SUBSTANCE

Lowell E. Norton, Princeton, N. J., assignor to Radio Corporation of America, a corporation of Delaware Application December 30, 1953, Serial No. 401,357

14 Claims. (Cl. 250—36)

This invention relates generally to the generation of phase coherent electrical oscillations and particularly relates to means for utilizing the resonance properties of particles not in thermal equilibrium for generating oscillatory energy in the microwave portion of the frequency spectrum.

An object of the present invention is to provide improved means for utilizing the resonance properties of particles for generating phase coherent electrical energy.

Another object of the invention is to provide improved means for deriving phase coherent electrical energy from particles not in thermal equilibrium.

Another object of the invention is to utilize the molecular resonance phenomenon of substances having particles not in thermal equilibrium for producing phase coherent microwave energy.

Another object of the invention is to provide a new and improved mechanism for generating phase coherent electrical oscillations.

Another object of the invention is to provide means for generating phase coherent electrical energy utilizing quantum level energy transitions.

A further object of the invention is to provide a novel microwave oscillator capable of efficient operation substantially in or near the millimeter wave region.

A further object of the invention is to provide new and improved means for generating coherent oscillatory energy.

A further object of the invention is to adapt the principles of microwave spectroscopy to the generation of phase coherent microwave energy.

In accordance with the presnt invention, particles of a substance, for example, the molecules of a confined body of gas are caused to assume a population distribution in various discrete quantum energy states which is that defining a positive temperature. With such a population distribution the lower energy states are more densely populated than the higher energy states and the particles are in a condition of thermal equilibrium. The population distribution of the particle energy states then suddenly is inverted. With the inversion effected rapidly, for a short time thereafter the particles do not have sufficient time ot re-orient their spins and energy distributions, and the spins and energy distributions are those defining a negative temperature. The higher energy states thus are more densely populated than the lower energy states and the particles no longer are in thermal equilibrium.

The total energy possessed by the substance or body of gas increases by virtue of the population distribution inversion thereby indicating that the substance or body has absorbed energy. Under these conditions the particles of the substance are not in thermal equilibrium. The inverted population distribution condition is an unstable one and the particles finally re-orient their spins and energy distributions to that defining a positive temperature and return to the condition of thermal equilibrium. In returning to the equilibrium condition the particles radiate energy at frequencies at which the particles are resonant. Ordinarily these transitions lead only to incoherent emissions. A large problem solved by the instant invention is that of producing coherent emission. The state inversion repetition rate and duration is chosen so that the output excitation field, initially started by noise, does not decay to such a value that it must be re-started by noise. Bursts of output energy resulting from successive state inversions act as a coherent excitation to induce further transitions which are then also coherent. The radiated phase coherent energy at a desired output frequency or frequencies may then be derived and utilized as desired.

The invention and various embodiments thereof will be described in greater detail with reference to the accompanying drawing in which:

Figure 1 is a view in perspective of apparatus employing Stark effect for generating phase coherent electrical oscillations, according to the invention;

Figure 2 is a perspective view of an embodiment of the invention employing Zeeman effect;

Figure 3 is a diagram illustrating the wave shape of state inverting pulses utilized in the apparatus shown in Figures 1 and 2;

Figure 4 is a schematic circuit diagram of an embodiment of the invention employing a plurality of gas cells utilized to produce coherent continuous wave energy;

Figure 5 shows a series of wave diagrams illustrating the sequential manner in which state inverting pulses are applied to the gas cells of Figure 4; and Figure 6 is a schematic circuit diagram of a further embodiment of the invention in which a pair of 90° Faraday rotators are connected to each gas cell and are utilized for microwave switching.

Similar reference characters are applied to similar elements throughout the drawings.

*Theory*

Assume that a substance has at least two discrete energy levels $E_1$ and $E_2$ and that transitions between these levels occur. Also assume that $E_1 > E_2$. While there actually are many more discrete levels ($E_3$, $E_4$, $E_5$, ... $E_n$), only levels $E_1$ and $E_2$ will be considered in the present discussion. For the substance in thermal equilibrium the number of elemental particles $N_1$ in state $E_1$ is $$N_1 \alpha \epsilon^{-\frac{E_1}{kT}} \quad (1)$$

and the number of elemental particles $N_2$ in state $E_2$ is $$N_2 \alpha \epsilon^{-\frac{E_2}{kT}} \quad (2)$$

where $T$ is the absolute temperature in degrees Kelvin, $k$ is Boltzmann's constant, and the proportionality factors in (1) and (2) are the same.

If $E_1$ and $E_2$ are vibrational states, in terms of $N$, the total number of elemental particles involved, $N_1$ and $N_2$ are $$N_1 = \frac{N \epsilon^{-\frac{E_1}{kT}}}{Q_v} \quad (3)$$

and $$N_2 = \frac{N \epsilon^{-\frac{E_2}{kT}}}{Q_v} \quad (4)$$

where $Q_v$ is the vibrational state sum.

If the states $E_1$ and $E_2$ are rotational states of the lowest vibrational state, then $$N_1 = \frac{N(2J+1)\epsilon^{-\frac{E_1}{kT}}}{Q_r} \quad (5)$$

and $$N_2 = \frac{N(2J+1)\epsilon^{-\frac{E_2}{kT}}}{Q_r} \qquad (6)$$

where $Q_r$ is the rotational state sum and $(2J+1)$ is the statistical weight due to the $(2J+1)$ fold-state degeneracy in the absence of a field impressed on the substance. The quantity $J$ is the total angular momentum.

In either case $$\frac{N_1}{N_2} = \epsilon^{-\frac{(E_1-E_2)}{kT}} = \epsilon^{-\frac{h\nu}{kT}} \qquad (7)$$

where $h\nu$ is an energy quanta at frequency $\nu$, and $h$ is Planck's constant.

It is known that for a condition of thermal equilibrium $N_2 > N_1$. If an electromagnetic field of frequency $$\nu = \frac{E_1 - E_2}{h}$$

is applied to the substance the field induces transitions $E_1 \rightleftarrows E_2$. Averaged over all the elemental particles N, the transition probability per particle for $E_1 \rightarrow E_2$ is the same as that for $E_2 \rightarrow E_1$. Denoting the transition probability $E_1 \rightarrow E_2$ as $P_{12}$ and the transition probability $E_2 \rightarrow E_1$ as $P_{21}$, then, averaged over all the particles, $$P_{12} = P_{21} \qquad (8)$$

Since initially $N_2 > N_1$, in response to the field of frequency $$\nu = \frac{E_1 - E_2}{h}$$

the transitions $E_2 \rightarrow E_1$ outnumber the transitions $E_1 \rightarrow E_2$ and there is a net or excess of transitions $E_2 \rightarrow E_1$. This results in a net increase of system energy which is attributable to energy absorption from the exciting electromagnetic field. However, $N_2$ is still greater than $N_1$.

The rate of energy emission by particles initially in state $E_1$ (resulting from transition $E_1 \rightarrow E_2$) is $$\text{Power}_{\text{emitted}} = P_{12}N_1(E_1 - E_2) = P_{12}N_1 h\nu \qquad (9)$$

The rate of energy absorption by particles initially in state $E_2$ (resulting from transition $E_2 \rightarrow E_1$) is $$\text{Power}_{\text{absorbed}} = P_{21}N_2(E_1 - E_2) = P_{21}N_2 h\nu \qquad (10)$$

From Equation 7, in the microwave portion of the frequency spectrum and at room temperature $$\frac{h\nu}{kT} \approx \frac{1}{200}$$

Therefore, $$N_1 \approx N_2\left(1 - \frac{h\nu}{kT}\right) \qquad (11)$$

From Equations 8, 9, 10, and 11, $$\text{Power}_{\text{absorbed}} - \text{Power}_{\text{emitted}} = P_{12}N_2\left(\frac{h\nu}{kT}\right)^2 \qquad (12)$$

and this is a positive quantity which is characteristic of the particles in the discrete quantum energy states having a population distribution defining a positive temperature. If the solution to Equation 12 were made negative there would be a net energy emission by the particles. This condition is characteristic of the particles assuming a population distribution defining a negative temperature (i. e., $N_1 > N_2$). In such condition the particles are not in thermal equilibrium.

The quantity in Equation 12 is made negative in accordance with the invention in the following manner. A perturbing field is applied to the particles so that space quantization of the angular momentum results and the momentum assumes $(2J+1)$ discrete components. This perturbing field is maintained for a time long enough for the particles of the substance to be in a condition of thermal equilibrium. In such condition population distribution of particles in various discrete quantum energy states is that of a positive temperature. The field then is suddenly reversed. When the field reversal is effected quickly, for a short time thereafter the particles do not have sufficient time to re-orient their spins and energy distributions and the spins and energy distributions are those of a negative temperature. During this short interval following the field reversal the higher energy states ($E_1$, for example) are more densely populated than the lower energy states ($E_2$, for example) and, with an exciting electromagnetic field of frequency $$\nu = \frac{E_1 - E_2}{h}$$

somehow applied, $\text{Power}_{\text{absorbed}} - \text{Power}_{\text{emitted}}$ is a negative quantity and there is net emission by the particles at frequencies at which the particles are resonant. The emitted energy at one or more of these frequencies may then be utilized as desired.

Generator employing Stark effect

Referring to Figure 1, a microwave generator comprises a sealed gas-tight cell 11 containing a gas capable of exhibiting molecular resonance and having a reasonable sized linear rather than quadratic Stark effect. Such gases, by way of example, include ammonia, carbonyl sulphide, or one of the methyl halides. The cell 11 comprises a length of rectangular waveguide preferably having its inner surfaces silver plated. The cell 11 is made gas-tight by means of mica or quartz windows 13, 13 which are permeable to the transmission of microwave energy and is exhausted to a pressure of the order of $10^{-2}$ millimeters of Hg or lower. A Stark electrode 14 is contained within the cell 11 and preferably is positioned midway between the broad walls of the cell and insulated therefrom. A bandpass filter 15, capable of passing substantially only $$\nu = \frac{E_1 - E_2}{h}$$

and a 45° Faraday rotator 17 are serially connected in a loop circuit with the cell 11.

The 45° Faraday rotator 17 is a one-way energy propagation device. Its structure and principles of operation are described in detail in volume XXXII, number 5 of the Bell System Technical Journal (September 1953), pp. 1155–1172. Briefly, however, the device comprises an input section of rectangular waveguide 34, a 45° twist section of waveguide 19, a circular waveguide section 21 connected to the rectangular section 19 and containing a ferrite cylinder 23, and an output waveguide section 25 connected to the circular section 21. The rectangular guides 19 and 25 are connected to the circular section 21 so that at their respective points of connection to the section 21 the broad walls of the guides 19 and 25 are oriented at 45° with respect to each other. A solenoid 27 is provided for applying a steady magnetic field to the ferrite 23 in a direction parallel to the path of transmission of electromagnetic waves through the material. A D.-C. current source (not shown) may be connected to the solenoid terminals 29, 29 and adjusted to provide a field strength sufficient to rotate the plane of polarization of electromagnetic energy coupled into the device through an angle of 45°.

Consider briefly the operation of the device 17. Assume that energy is coupled into the Faraday device by waveguide section 19. The plane of polarization of the input energy at the point of transition from the guide 19 to the circular section is 45° counter-clockwise with respect to the plane of the output guide section 25. The magnetic field applied to the ferrite 23 causes a 45° clockmaster timer capable of producing the offset voltage waveforms of Figure 5 may be used. However, particularly useful methods are illustrated in applicants' U. S. Patents 2,289,987 and 2,289,988. To obtain the desired waveforms of Figure 5, where the short time interval 35 is designated as $\Delta T_{35}$, the fastest (timing) oscillator required would operate at frequency $1/\Delta T_{35}$. Cited patents illustrate how, by suitable choice of multivibrator division ratios, the desired keying can be synthesized. Wave train No. 1 is applied simultaneously to the solenoid of 90° Faraday rotator No. 1 and also to either the Stark electrode or the coil associated with gas cell No. 1. An isolation amplifier 43 is provided for isolating the No. 1 rotator and gas cell No. 1. Since the solenoids of 90° rotators No. 2 through No. $n$ are not supplied with current during the period 35 in which the solenoid of 90° rotator No. 1 is energized, those rotators (No. 2 through No. $n$) serve as open microwave switches which disconnect channels 2 through $n$ from the loop circuit. A burst of energy at frequency $$\nu = \frac{E_1 - E_2}{h}$$

may then be derived from channel No. 1 during the interval 35.

An instant of time later the solenoid of Faraday rotator No. 2 and gas cell No. 2 are activated by wave train No. 2. During the interval in which state inversion in channel 2 occurs, the solenoids of the 90° Faraday rotators in all other channels are not energized and they again serve to disconnect the channels in which they are located from the loop circuit. A burst of energy at the desired output frequency may then be derived from channel 2 during interval 35'. Wave trains No. 3, No. 4, . . . No. $n$ are successively applied in the foregoing manner (channels 3 and 4 not being illustrated) so that one channel is always in a state inverted condition and active in producing microwave energy. Thus microwave energy is continuously available at the desired output frequency. The pulse repetition rate of wave trains produced by the timer 41 is chosen so that the excitation field in a given gas cell, once started by noise, is not allowed to decay to such a low value that it must be re-started by noise. The continuously present excitation field is that which provides for phase coherence of the continuous wave output energy.

In Figure 6 an embodiment of the invention is shown which affords several advantages over the arrangement illustrated in and described with reference to Figure 4. In Figure 4 although $n-1$ channels always are electrically disconnected from one end of the loop circuit, the fact the other end remains connected to the loop circuit may cause undesirable effects to occur. One of these effects is that energy unavoidably coupled into an inactive gas cell may be undesirably reflected back into the loop circuit. Another unwanted effect is that a portion of the loop energy thus diverted into undesired channels is absorbed and attenuated in its passage through the gas and energy is thereby lost. To obviate these effects it is preferred that a second 90° Faraday rotator be connected into each channel. These additional 90° rotators are designated by primes and are each connected to the end of the gas cell opposite that to which the original 90° rotators are connected. The solenoids of the 90° rotators in any given channel are energized simultaneously. The circuit of Figure 6 thus provides for improved operation over the circuit of Figure 4 but this improved operation is attained at the expense of one additional rotator device for each channel.

In any of the systems of Figure 1, Figure 2, Figure 4, or Figure 6 the output is phase coherent for the following reason. The state inverting pulse repetition rate, and pulse length are so chosen that the excitation field, once started by noise, is not allowed to decay to such a low value that it must be re-started by noise. For all cases the loop path length must be correct to sustain oscillation.

What is claimed is:

1. Apparatus for generating electrical energy comprising, a body of microwave resonant gas having molecules normally in thermal equilibrium, means for effecting molecular transitions between various discrete quantum energy states of said gas to temporarily disturb said thermal equilibrium, and means for utilizing quantum level transitions between at least two discrete quantum energy states for deriving phase coherent electrical energy from said body of gas while said equilibrium is disturbed.

2. Apparatus for generating electrical energy comprising means for applying a perturbing field to particles of a microwave resonant substance for a sufficient interval of time to insure that the population distribution of particles in various discrete quantum energy states is that of a defined positive temperature, means for reversing said perturbing field to invert the population distribution of said quantum energy states to that defining a negative temperature, said field reversal being maintained for an interval of time sufficiently short that said particles have insufficient time to establish a condition of thermal equilibrium, and means for utilizing quantum level transitions between at least two of said discrete quantum energy states for deriving phase coherent electrical energy during the period of said inversion.

3. Apparatus for generating electrical energy comprising, a microwave resonant substance having a population distribution of particles in various discrete quantum energy states which is that of a defined positive temperature, means for impressing a field on said substance to invert the population distribution of said particles to that defining a negative temperature, and means for deriving phase coherent electrical energy from said substance during the period of said inversion.

4. Apparatus for generating electrical energy comprising, a microwave resonant substance having a population distribution of particles in various discrete quantum energy states which is that of a defined positive temperature, means for impressing a Stark field on said substance to invert the population distribution of said particles to that defining a negative temperature, and means for deriving phase coherent electrical energy from said substance during the period of said inversion.

5. Apparatus for generating electrical energy comprising, a microwave resonant substance having a population distribution of particles in various discrete quantum energy states which is that of a defined positive temperature, means for impressing a Zeeman field on said substance to invert the population distribution of said particles to that defining a negative temperature, and means for deriving phase coherent electrical energy from said substance during the period of said inversion.

6. Apparatus for generating electrical energy comprising, a sealed cell containing a microwave resonant body of gas, means for impressing a field on said body of gas whereby during a first interval of time the gas molecules in various discrete quantum energy states assume a population distribution which is that of a defined positive temperature and during a second interval of time immediately following said first interval the molecules assume a population distribution which is that of a defined negative temperature, a unidirectional microwave energy propagation device connected in a loop circuit with said sealed cell, and means for deriving phase coherent electrical energy from said cell during said second interval.

7. Apparatus as claimed in claim 6 wherein said first interval of time is greater than said second interval of time.

8. Apparatus as claimed in claim 6 including a bandpass filter connected in said loop circuit.

9. Apparatus for generating phase coherent microwave energy comprising, a sealed cell containing a microwave resonant body of gas, said cell being gas-tight and subwise rotation in the polarization of energy travelling through the device. This results in the plane of polarization being such that the electric vector is normal to the broad walls of the output guide 25 and thus excites the guide. Now consider energy travelling through the device in the reverse direction. With the guide 25 excited, the field applied to the ferrite 23 again causes a 45° clockwise rotation in the polarization of the input energy. However, in this instance the waveguide section 19 is oriented 45° counter-clockwise and the electric vector is normal to the narrow walls of the waveguide 19. Under these conditions the guide 19 is not excited and energy is not coupled from the device. The device 17 thus transmits energy only in one direction.

Microwave energy is generated in the following manner. A pulse generator 31 such as a free-running multivibrator produces an asymmetrical wave train of the shape shown in Figure 3. This wave train is applied between the Stark electrode 14 and the wall of the sealed cell 11 thereby subjecting the molecules of the gas to a perturbing electric field. The relatively long portion 33 of a given cycle of the wave train is made sufficiently great that the molecules of the gas reach a condition of thermal equilibrium. $N_2 > N_1$ and this condition is definitive of a normal positive temperature. After the molecules have reached the equilibrium condition the electric field suddenly is reversed. The population distribution of states $E_1$ and $E_2$ are inverted and $N_1 > N_2$. This condition is definitive of a negative temperature.

As mentioned previously, for the net emission of energy to occur a field of frequency $$\nu = \frac{E_1 - E_2}{h}$$

must somehow be applied to the gas. Just as in any feedback oscillator the starting mechanism in the instant structure is noise. There is a noise component present at frequency $$\nu = \frac{E_1 - E_2}{h}$$

which provides momentary excitation of the gas. The net power gain for a 3, 3 collision broadened ammonia line has been calculated to be approximately 1.052 per meter of silver plated waveguide loop path length. Under these conditions the amplified excitation is propagated around and around the closed loop as a single running wave. Without the one-way transmission device 17, due to symmetry, there would be initial propagation of the same velocity in both directions through the gas cell and loop. The absorption factors of the gas, both the positive one associated with temperature $+T$ and the negative one associated with temperature $-T$ would be greatly reduced and could approach zero. The bandpass filter 15 at $$\nu = \frac{E_1 - E_2}{h}$$

need be only good enough to preclude other frequencies $$\nu_{nm} = \frac{E_n - E_m}{h}$$

from being generated and circulated in the loop. A preferred variation may use dielectric loading (not shown) in the waveguide cell to give a better approximation to plane wave propagation.

As in any loop or feedback amplifier the output field builds up with each pasage around the loop until limiting occurs and the loop gain stabilizes at unity. The limiting action in the present case is provided by a quantum mechanical effect. As the microwave excitation field increases in intensity, the population densities $N_1$ and $N_2$ of the states $E_1$ and $E_2$ tend to equalize. Additional increases in excitation field intensity do not produce additional net $E_1 \rightarrow E_2$ over $E_2 \rightarrow E_1$ transitions. Thus there is no further increase in negative absorption with increasing field and the system limits with unity gain. Energy may then be coupled from the sealed cell 11 at frequency $$\nu = \frac{E_1 - E_2}{h}$$

by some convenient means such as a directional coupler 37. The output energy is derived in bursts for each period of time 35 between the instant of state inversion and the time at which the gas returns to a condition of thermal equilibrium. As a typical example, the time interval 35 may be of the order of one to ten microseconds and the interval 33 may be five to ten times greater.

While the foregoing method of energy generation has been described in connection with the state reversal of a perturbing field applied to a gas, the method is equally applicable to solids or liquids. For example, suitable paramagnetic salts such as $MnSO_4 \cdot 2H_2O$ may be utilized in this manner. In the case of certain substances it may be desirable or necessary to apply to Stark field at right angles to the microwave electric field.

*Generator employing Zeeman effect*

Figure 2 shows an embodiment of the invention in which Zeeman rather than Stark effect is utilized for state inversion. In this instance the Stark electrode 14 of Figure 1 is omitted and a coil 39 is wound about the sealed cell 11. The coil 39 is coupled to the pulse generator 31. The generator 31 again produces the asymmetrical wave train shown in Figure 3. The portion 33 of the asymmetrical wave train causes the gas molecules to reach the condition of thermal equilibrium heretofore discussed. The magnetic field then is suddenly reversed and, with the noise component present at frequency $$\nu = \frac{E_1 - E_2}{h}$$

for the period 35 a state reversal occurs in which $N_1 > N_2$. There is a net emission of microwave energy and this emission occurs until the molecules again reach thermal equilibrium. Bursts of microwave energy thus are made available during each such interval following the state inversion and the output energy coupled from the loop by the directional coupler may be utilized as desired. As before, in the case of certain substances it may be necessary or desirable to apply the Zeeman field at right angles to that shown in Figure 2.

*C-W energy generation*

Figures 4 and 6 show structure whereby microwave energy may be derived continuously rather than in bursts as hereinbefore described.

Referring to Figure 4, the 45° Faraday rotator 17 and the bandpass filter 15 are serially connected in the manner described previously. A 90° Faraday rotator (No. 1) and a gas cell (No. 1) are connected to the 45° rotator 17 and the filter 15 thereby completing a loop circuit. 90° rotators No. 2 through $n$ and associated gas cells No. 2 through $n$ are connected in shunt with rotator No. 1 and cell No. 1. The 90° rotators are similar to the 45° rotator except that the input and output waveguide sections of each device have their planes of symmetry displaced 90°. Also, the field applied to the solenoid of each device is adjusted to be of sufficient intensity (when energized) to rotate the plane of polarization of energy input thereto through an angle of 90°. The gas cells No. 1, No. 2, . . . No. $n$ may employ either Stark effect or Zeeman effect.

In operation, a master timer 41 produces asymmetrical wave trains substantially as shown in Figure 5. Any stantially permeable to microwave energy, means for impressing a field on said body of gas whereby during a first interval of time the gas molecules in various discrete quantum energy states assume a population distribution which is that of a defined positive temperature and during a second interval of time immediately following said first interval the molecules assume a population distribution which is that of a defined negative temperature, a 45° Faraday rotator and a bandpass filter connected in a loop circuit with said sealed cell, and means coupled to said sealed cell for deriving phase coherent electrical energy from said cell during said second interval.

10. Apparatus for generating phase coherent microwave energy comprising, a plurality of sealed cells each containing a body of gas responsive to an impressed field whereby during a first interval of time the gas molecules in various discrete quantum energy states assume a population distribution which is that of a defined positive temperature and during a second interval of time immediately following said first interval the molecules assume a population distribution which is that of a defined negative temperature, means for successively impressing a field on said bodies so that said bodies one at a time assume the population distribution of said negative temperature, a circuit including a unidirectional energy propagation device and a bandpass filter, means for electrically connecting said gas cells one at a time to said circuit so that said circuit at every instant is connected to a gas cell in which the gas molecules have a population distribution defining said negative temperature, and means coupled to all of said cells for continuously deriving coherent microwave energy.

11. Apparatus for generating coherent microwave energy comprising, a plurality of sealed cells each containing a body of gas responsive to an impressed field whereby during a first interval of time the gas molecules in various discrete quantum energy states assume a population distribution which is that of a defined positive temperature and during a second interval of time immediately following said first interval the molecules assume a population distribution which is that of a defined negative temperature, means for successively impressing a Stark field on said bodies so that said bodies one at a time assume the population distribution of said negative temperature, a circuit including a unidirectional energy propagation device and a bandpass filter, means for electrically connecting said gas cells one at a time to said circuit so that said circuit at every instant is connected to a gas cell in which the gas molecules have a population distribution defining said negative temperature, and means coupled to all of said cells for continuously deriving coherent microwave energy.

12. Apparatus for generating phase coherent microwave energy comprising, a plurality of sealed cells each containing a body of gas responsive to an impressed field whereby during a first interval of time the gas molecules in various discrete quantum energy states assume a population distribution which is that of a defined positive temperature and during a second interval of time immediately following said first interval the molecules assume a population distribution which is that of a defined negative temperature, means for successively impressing a Zeeman field on said bodies so that said bodies one at a time assume the population distribution of said negative temperature, a circuit including a unidirectional energy propagation device and a bandpass filter, means for electrically connecting said gas cells one at a time to said circuit so that said circuit at every instant is connected to a gas cell in which the gas molecules have a population distribution defining said negative temperature, and means coupled to all of said cells for continuously deriving coherent microwave energy.

13. Apparatus as claimed in claim 12 wherein said unidirectional energy propagation device is a 45° Faraday rotator, and a 90° Faraday rotator is connected to one end of each of said gas cells, the fields of each 90° Faraday rotator being energized in synchronism with the field impressed on the gas cell connected thereto.

14. Apparatus as claimed in claim 10 wherein said unidirectional energy propagation device is a 45° Faraday rotator, and a 90° Faraday rotator connected to each end of each of said gas cells, the fields of the 90° Faraday rotators connected to a given gas cell being energized in synchronism with the field impressed on the cell connected thereto.

References Cited in the file of this patent
UNITED STATES PATENTS

| | | |
|---|---|---|
| 2,051,537 | Wolff et al. | Aug. 18, 1936 |
| 2,555,131 | Hershberger | May 29, 1951 |
| 2,591,258 | Hershberger | Apr. 1, 1952 |
| 2,644,930 | Luhrs et al. | July 7, 1953 |